(12) United States Patent
Hikmet

(10) Patent No.: US 6,833,166 B2
(45) Date of Patent: Dec. 21, 2004

(54) ANISOTROPIC COMPOSITE COMPRISING A MIXTURE OF A POLYMERIC NETWORK AND AN INORGANIC MATERIAL

(75) Inventor: Rifat Ata Mustafa Hikmet, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 8 days.

(21) Appl. No.: 10/188,782

(22) Filed: Jul. 3, 2002

(65) Prior Publication Data

US 2003/0015688 A1 Jan. 23, 2003

(30) Foreign Application Priority Data

Jul. 10, 2001 (EP) .......................................... 01202653

(51) Int. Cl.$^7$ .............................................. C09K 19/00
(52) U.S. Cl. ........................ 428/1.1; 428/1.2; 428/1.3; 428/413; 428/419; 349/187; 349/500
(58) Field of Search ........................ 428/1.1, 1.2, 1.25, 428/1.26, 1.28, 1.3, 1.31, 413, 419, 473.5, 474.4, 480, 532; 252/299.01; 349/10, 183, 187, 500

(56) References Cited

U.S. PATENT DOCUMENTS

| | | | | |
|---|---|---|---|---|
| 4,892,392 A | * | 1/1990 | Broer | 350/339 R |
| 5,073,294 A | * | 12/1991 | Shannon et al. | 252/299.01 |
| 5,097,029 A | * | 3/1992 | Shannon | 544/249 |
| 5,188,760 A | | 2/1993 | Hikmet et al. | 252/299.01 |
| 5,510,431 A | * | 4/1996 | Earls et al. | 525/481 |
| 5,731,405 A | * | 3/1998 | Gibbons et al. | 528/353 |
| 5,807,498 A | * | 9/1998 | Gibbons et al. | 252/299.4 |
| 6,563,640 B1 | * | 5/2003 | Ignatov et al. | 359/491 |

FOREIGN PATENT DOCUMENTS

| | | | |
|---|---|---|---|
| FR | 2738249 A1 | 3/1997 | ............. C07F/3/06 |
| WO | WO9709295 | 3/1997 | ........... C07C/65/21 |

OTHER PUBLICATIONS

"Structure and Mobility within Anisotropic Networks Obtained by Photopolymerization of Liquid Crystal Molecules" R.A.M. Hikmet, et al., Macromolecules 1992, 25, 4194–4199.

"Anisotropic Networks and Gels Obtained by Photopolymerisation in the Liquid Crystalline State: Synthesis and Applications" R.A.M. Hikmet and J. Lub, Prog. Polym. Sci, vol. 21, 1165–1209, 1996.

"Effect of the Orientation of the Ester Bonds on the Properties of Three Isomeric Liquid Crystal Diacrylates before and after Polymerization", R.A.M. Hikmet, et al., Macromolecules 1995, 28, 3313–3327.

"N–Substituted 2,3–Dicarboximido–Anthraquinone Dichroic Dyes", S. Aftergut and H.S. Cole, Jr., Mol. Cryst. Liq. Cryst., 1981, vol. 78, pp. 271–277.

\* cited by examiner

*Primary Examiner*—Shean C. Wu
*Assistant Examiner*—Jennifer R. Sadula

(57) ABSTRACT

The invention pertains to an anisotropic composite comprising a mixture of a) an anisotropic oriented polymeric network with one or more binding moieties obtainable from a liquid crystalline monomer or a liquid crystalline mixture of monomers, at least one of the monomers comprising a polymerizable group selected from acrylate, epoxy, oxetane, vinyl ether, and thiolene, and b) an inorganic material, characterized in that the network has an order parameter S greater than 0.01 and that the inorganic material is a substantially water-insoluble inorganic salt, a free metal particle, or a mixture thereof.

12 Claims, 5 Drawing Sheets

+ H₂S

Figure 1:
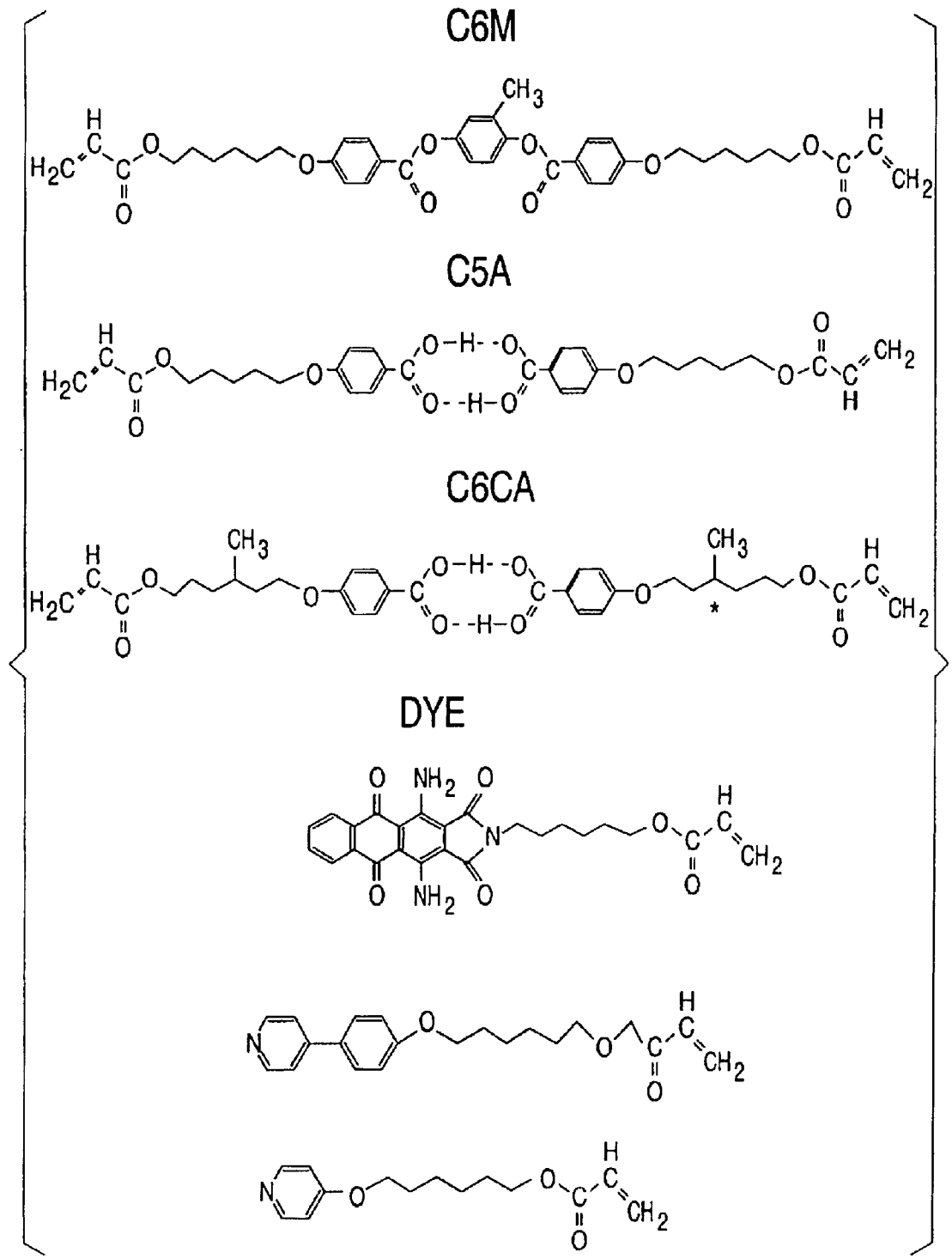

ANISOTROPIC COMPOSITE COMPRISING A MIXTURE OF A POLYMERIC NETWORK AND AN INORGANIC MATERIAL

The invention pertains to an anisotropic composite comprising a mixture of a) an anisotropic oriented polymeric network with one or more binding moieties obtainable from a liquid crystalline monomer or a liquid crystalline mixture of monomers, at least one of the monomer comprising a polymerizable group selected from acrylate, epoxy, oxetane, vinyl ether, and thiolene, and b) an inorganic material, to a method for manufacturing this material and its intermediate product, and optical devices comprising said material.

The size quantization effects in semiconductor particles are of great interest. In particles of nanometer size, a gradual transition from bulk to molecular structure occurs as the particle size decreases. The particles which show these quantization effects are often called quantum dots. They show size dependant optical and electronic properties. For example, the band gap of these materials can show increase by several electron volts with respect to the bulk material with decreasing particle size. This is reflected in the absorption and the photo-luminescence spectra of the materials that shift hundreds of manometers with decreasing particle size. The band gap of these materials has been adjusted to produce composites to obtain electroluminescence. In the case of conductive metal particles optical, properties such as absorption become also size dependant. Various methods have been described for obtaining composites of quantum dots in polymer matrices. Liquid crystalline materials comprising an anisotropic oriented polymeric network with one or more binding moieties obtainable from monomers comprising a polymerizable group selected from acrylate, epoxy, vinyl ether, and thiolene are known in the art. For example, in U.S. Pat. No. 5,188,760 such polymeric networks and their synthesis have been disclosed. It is also known that such networks can form ionic complexes with divalent metal cations, such as disclosed in FR 2,738,249 (WO 97/09295). However, it was found that the order parameter of these network complexes is extremely low, making such complexes unsuitable for use in optical devices.

It is an object of the invention to obtain particles in an ordered polymeric matrix, which show size dependent electrical and/or optical effects. It is also an object of the present invention to obtain a new type of anisotropic composites. The invention pertains to an anisotropic composite of the aforementioned mixture of a polymeric network and an inorganic material wherein a mixture is comprised of a) an anisotropic oriented polymeric network with one or more binding moieties, obtainable from a liquid crystalline monomer or a liquid crystalline mixture of monomers, at least one of the monomers comprising a polymerizable group selected from acrylate, epoxy, oxetane, vinyl ether, and thiolene, and b) an inorganic material, characterized in that the network has an order parameter S greater than 0.01 and that the inorganic material is a substantially water-insoluble inorganic salt, a free metal particle, or a mixture thereof. The mixtures according to this invention differ from the prior art compounds, such as disclosed in FR 2,738,249 in that they do not contain ionic complexes of binding moieties, such as carboxylate groups, with divalent cations. The present mixture comprises polymeric networks that still contain a binding moiety, preferably stabilized with hydrogen bonds, and chemical cross-links thereby securing a high orientation, as can be expressed as a high order parameter S. Preferred networks comprises a COOH, pyridine, or polyether moiety as the binding group. The mole ratio of the liquid crystalline monomers: the inorganic salt and/or free metal particle is preferably 100:1 to 1:5. More preferably, the mol ratio is 10:1 to 1:1.

The anisotropic composite has a nematic, smectic, discotic, or chiral nematic structure. These network are obtained from monomers, including monomers with acrylate, epoxy, oxetane, vinyl ether, and thiolene groups which are polymerizable, usually by a photopolymerization reaction. When cholesteric networks are desired, the mixture of monomers should comprise an amount of a chiral monomer. Preferred chiral monomers are monomers comprising a chiral center in the spacer connecting the binding moiety and the polymerizable group. An example of such a monomer is C6CA (FIG. 1). The chiral center may also be contained in a monomer without a polymerizable group. Preferably, the monomer or the mixture of monomers is in the thermotropic liquid crystalline phase.

Figure 2:
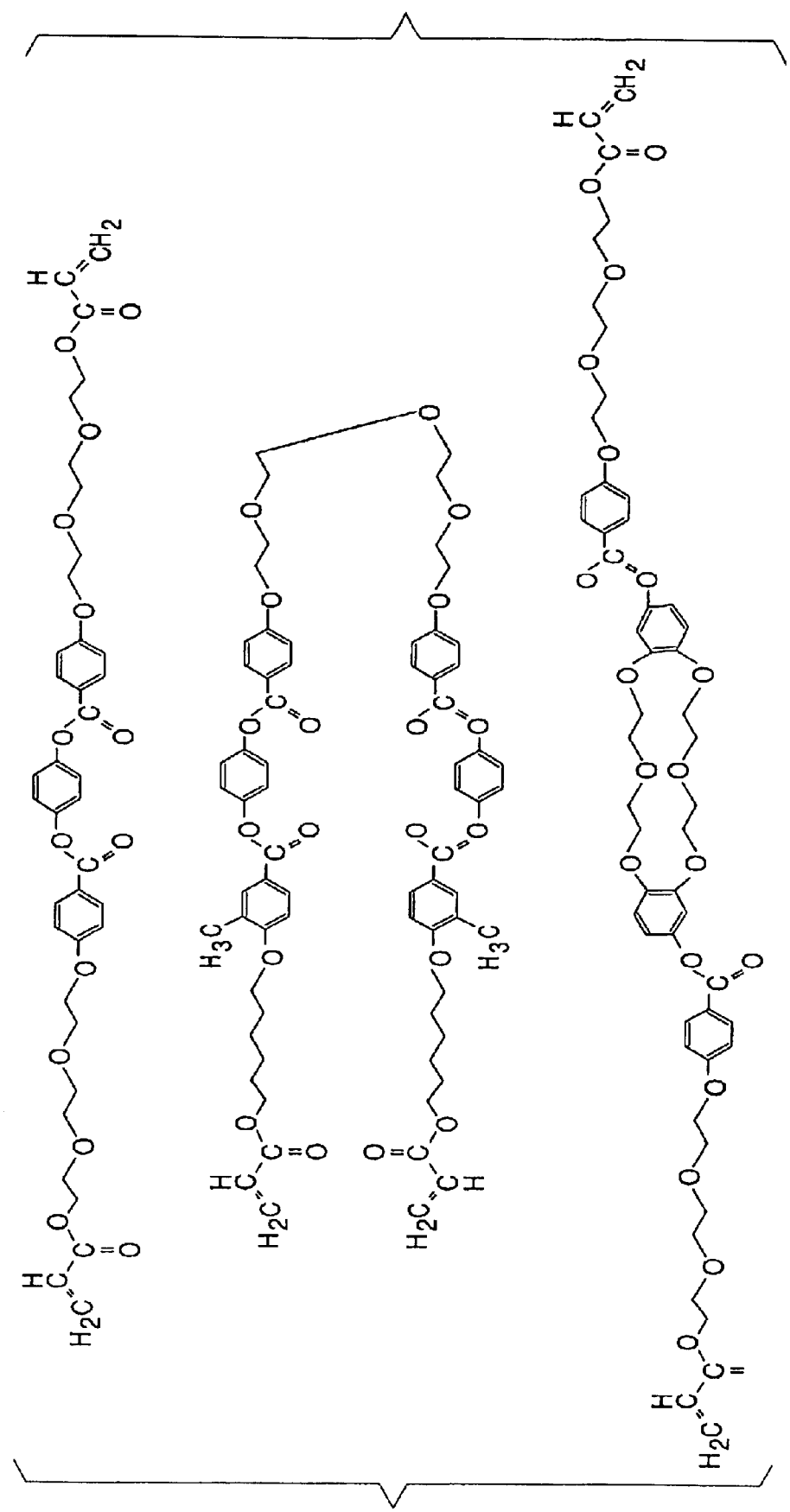

Examples of other monomers are C5A and C6M (FIG. 1), which are monoacrylate and diacrylate compounds, respectively, and due to the hydrogen bonding of the carboxylic groups can form a dimer. Such system shows liquid crystallinity. Other examples of suitable monomers comprising polyether moieties are exemplified in FIG. 2. The examples of FIGS. 1 and 2 can be prepared according to the methods disclosed in *Prog. Polym. Sci.*, 21, 1165–1209 (1996). Monomers C5A and C6M and mixtures thereof are crystalline at room temperature and become nematic upon melting. With increasing temperature the ordinary refractive index ($n_o$) tends to increase while the extraordinary refractive index ($n_e$) shows a decrease. These changes are associated with the order parameter S that is related to the clearing temperature. Order parameter S can be calculated from the refractive indices as shown in equation (1)

$$S \approx C \frac{3(n_e^2 - n_0^2)}{2n_0^2 + n_e^2 - 3} \tag{1}$$

wherein C is a constant related to the polarizability of the molecules. Using equation 1, C can be estimated for various mixtures. In this way, the order parameter S can be determined as a function of reduced temperature (which affects the refractive indices). The order parameter S must be greater than 0.01. Preferably, the order parameter S is greater than 0.1, more preferably greater than 0.4.

The anisotropic networks contain physical (hydrogen bonds) as well as chemical cross-links. Anisotropic networks are formed in the oriented state upon polymerization of the acrylate, epoxy, oxetane, vinyl ether, or thiolene groups. For example, it was found that the birefringence ($\Delta n = n_e - n_o$) of pure C5A shows a large decrease upon polymerization. This decrease is associated with the loss of macroscopic order within the sample. This indicates that physical cross-links formed by hydrogen bonds are not strong enough to maintain the order within the system. It was also found that in a mixture containing 10 wt. % of diacrylate (C6M) the high birefringence is sustained upon polymerization. This proves that a small number of chemical cross-links are enough for maintaining the order within the system. Looking at the temperature dependence of the refractive index of the networks it was found that the birefringence of the network, specially those containing a small amount of C6M, shows a rapid decrease around 110° C. This behavior can be best expressed in terms of the order parameter of the network. It can be assumed that the constant C remains unchanged upon polymerization and its use in equation (1) together with the measured refractive indices was used to determine the order parameter of the network. The determination of C is known in the art and is disclosed in *Macromolecules*, 95(28), 3313–3327 (1995) and *Macromolecules*, 92(25), 4194–4199 (1992). It was found that polymerized pure C5A (hydrogen bonds only) has a low order parameter. Networks containing C6M (chemical cross-links) on the other hand show a relatively high order parameter at room temperature. It was also found that up to about 100° C. the order parameter remains almost constant before showing a rapid decrease at higher temperatures. The decrease observed at higher temperatures is lower for mixtures containing higher concentrations of C6M. This indicates that within the mixtures the decrease of the order parameter is caused by the hydrogen bonded C5A molecules. Two peaks which are associated with the free and hydrogen bonded carbonyl bands were observed in the IR spectrum. The peak which appears at around 1733 cm$^{-1}$ originates from the carbonyl bands without hydrogen bonding in the central part of C6M and the acrylate end groups. Hydrogen bonded carbonyl groups of C5A showed a shift of about 48 cm$^{-1}$ and appeared in the IR spectrum at 1685 cm$^{-1}$. With increasing temperature the band at 1685 cm$^{-1}$ decreased in intensity while the intensity of the band at 1733 cm$^{-1}$ showed an increase. The chemical cross-links help maintaining the hydrogen bonds to a higher extent at elevated temperatures, as a result of which samples containing higher fraction of chemical cross-links sustain a higher degree of order at elevated temperatures.

The invention also pertains to a method for manufacturing the above-mentioned anisotropic composite. This method comprises a first step for the synthesis of an intermediate anisotropic oriented network product having one or more binding moieties, comprising polymerizing a liquid crystalline monomer or a liquid crystalline mixture of monomers, at least one of the monomers comprising a polymerizable group selected from acrylate, epoxy, oxetane, vinyl ether, and thiolene, in the presence of a metal salt, to obtain the anisotropic oriented intermediate polymeric network, or polymerizing the liquid crystalline monomer or the liquid crystalline mixture of monomers in the absence of the metal salt to an anisotropic oriented polymeric network with one or more binding moieties, followed by mixing said network with the metal salt, to obtain the intermediate anisotropic oriented network product.

The metal salt can in principle be any metal salt that is sufficiently soluble in the reaction medium. Preferably, the solubility of the metal salt is greater than 0.02 g per 100 ml of water at room temperature.

In a second step the anisotropic composite of the invention is made by converting the metal salt of the thus made intermediate anisotropic oriented network product to a substantially water-insoluble metal salt, a free metal particle, or a mixture thereof by standard methods known in the art.

The preferred method of preparing the anisotropic composite of the invention is the method wherein the intermediate anisotropic oriented network product is obtained by polymerizing the liquid crystalline monomer or the liquid crystalline mixture of polymers in the absence of the metal salt to an anisotropic oriented polymeric network with one or more binding moieties, followed by mixing said network with the metal salt, after which the metal salt is converted to a substantially water-insoluble metal salt, a free metal particle, or a mixture thereof.

For example, cadmium atoms were built into the network of C6M and C5A as a soluble cadmium salt, for instance cadmium acetate. Subsequently, the networks containing the cadmium atoms were subjected to H$_2$S gas and CdS quantum dots within the anisotropic network were produced.

Figures 1, 3:
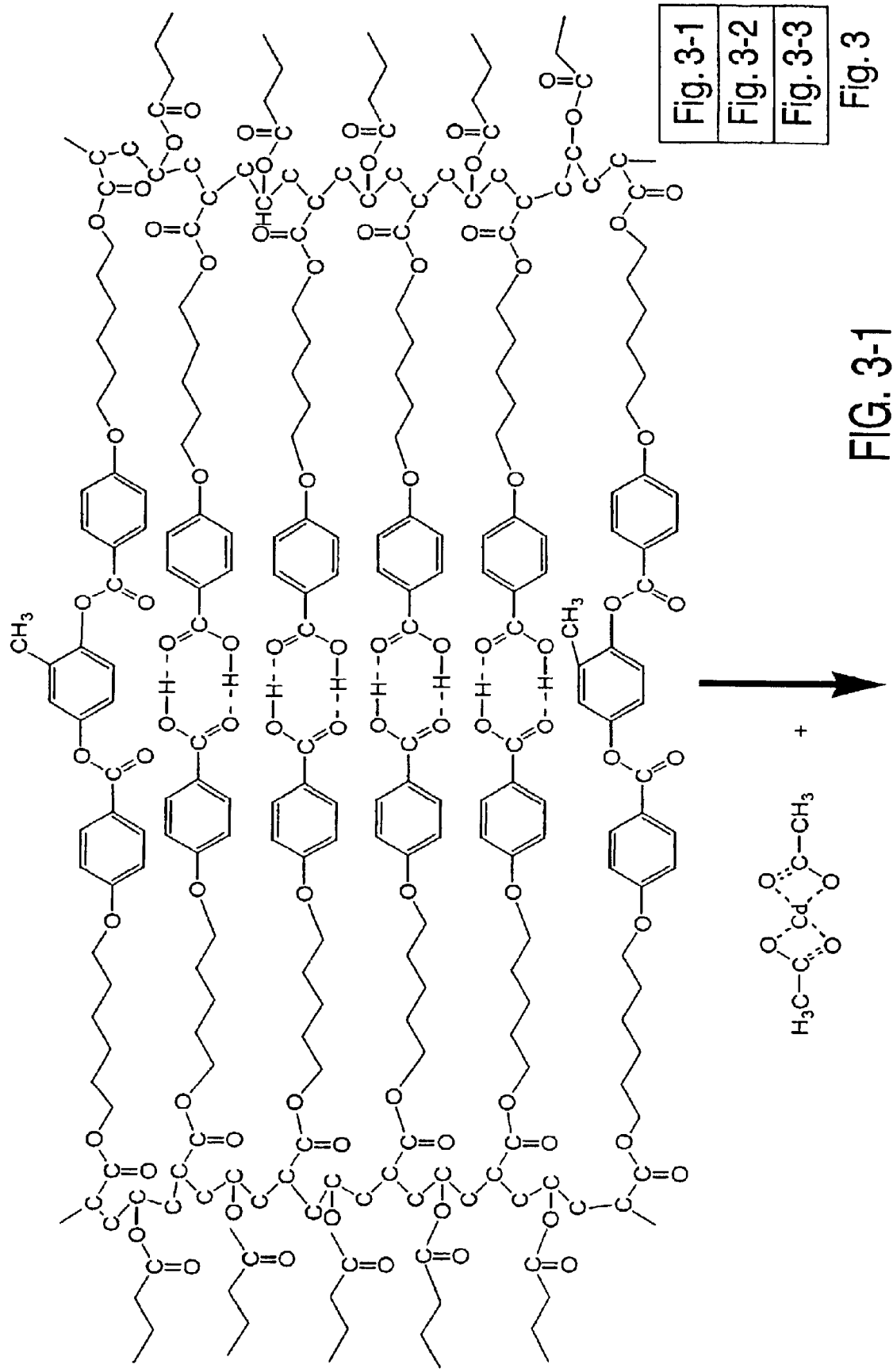
Figures 2, 3:
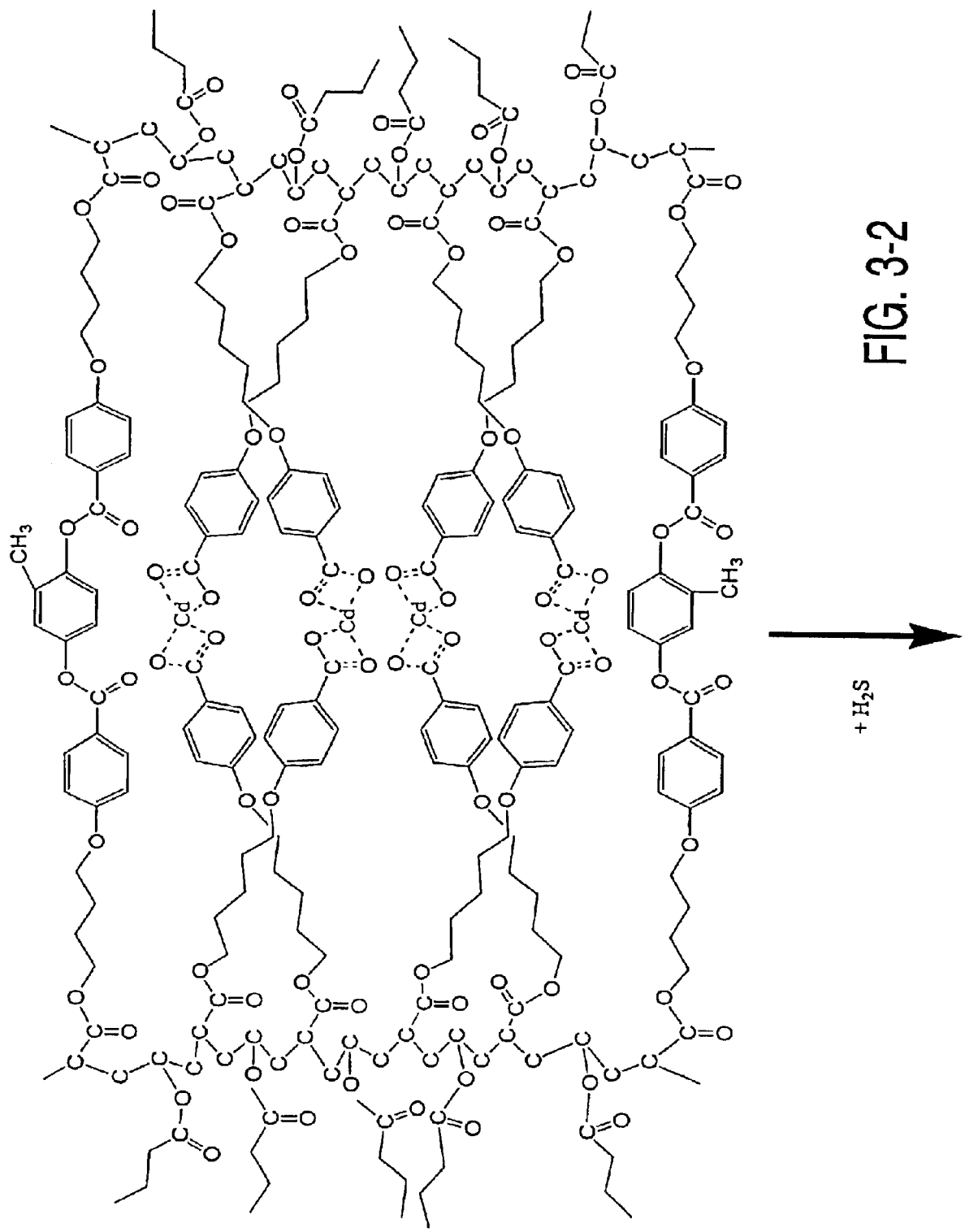
Figure 3:
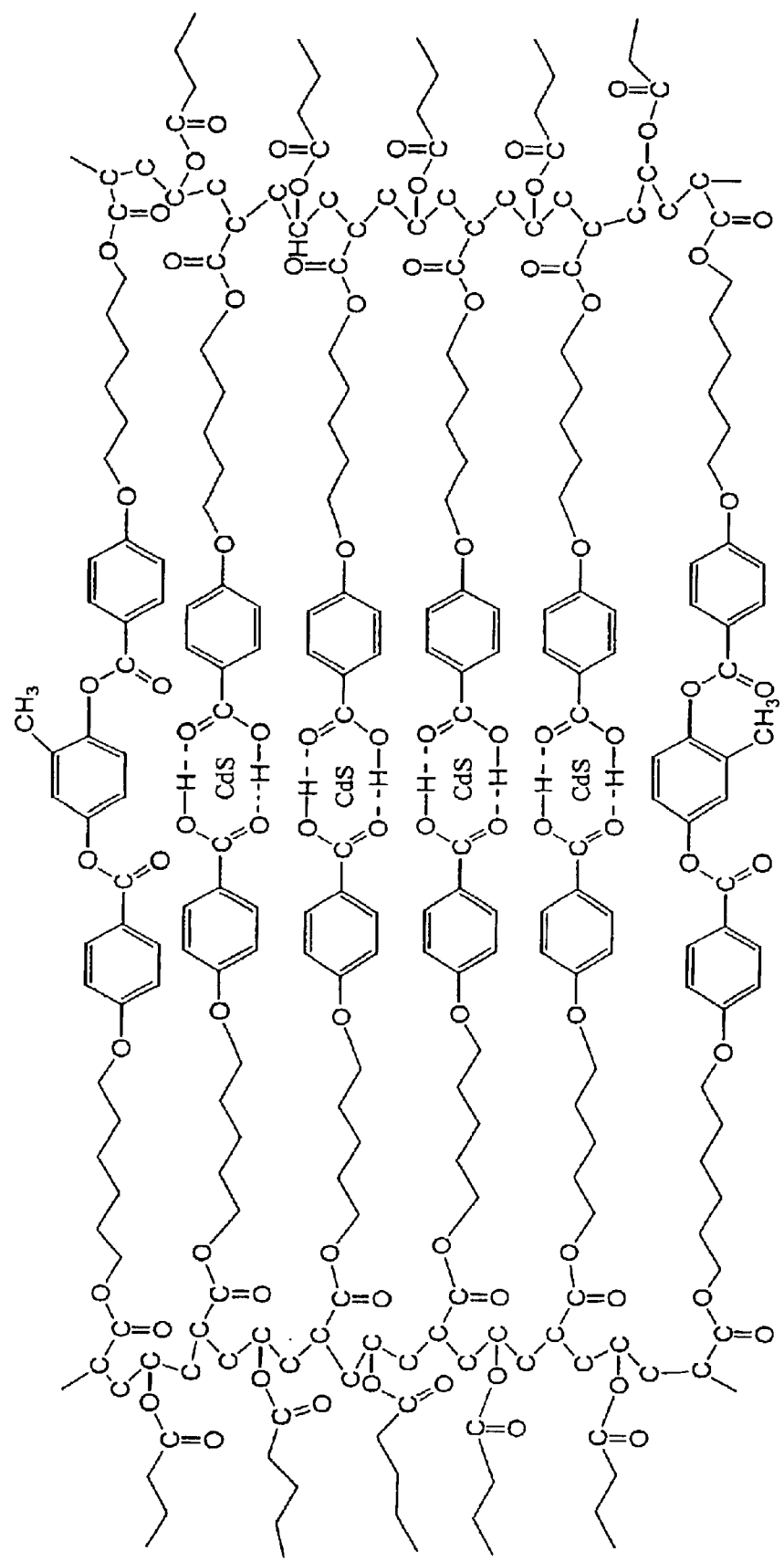

FIG. 3 schematically shows the steps of production of anisotropic composites. This reaction can be monitored by IR spectroscopy. Upon building cadmium into the system the ester band at 1685 cm$^{-1}$, which is indicative of hydrogen bonding, disappeared and a new band at 1530 cm$^{-1}$, which is indicative for the cadmium complex, appeared. Upon reaction of the network containing cadmium atom it can be seen that the band at 1685 cm$^{-1}$ appeared again while the band at 1530 cm$^{-1}$ disappeared indicating the formation of CdS and the re-appearance of the hydrogen bonds. The high birefringence of the sample observed after polymerization decreased to a large extent upon building cadmium into the system. This decrease is associated with the conformational change in the hydrogen bonded C5A dimers. While C5A dimer has a rod-like structure, neutralized compound with a cadmium center rather has a bent structure. The bent conformation of the molecule is the cause of the observed behavior.

Upon formation of CdS quantum dots in the network at room temperature, an increase in the birefringence with respect to that of the cadmium compound is observed. When the temperature dependence of the refractive indices of the composite during the heating cycle is considered, it can be seen that up to about 90° C. the refractive indices remains constant. Above this temperature up to about 130° C. ordinary refractive index increases while a decrease in the extraordinary refractive index is observed. Above 130° C. ordinary refractive index increases while extraordinary refractive index shows a decrease. This behavior is associated with the decrease of the order parameter at higher temperatures. When the sample was cooled to room temperature the extraordinary refractive index increased gradually while the ordinary refractive decreased indicating an increase in the order parameter of the system. The other important effect concerns the mean refractive index $[n_a = (2n_o + n_e)/3]$ of the material. After building cadmium into the networks, refractive indices change only marginally. However, after the production of CdS there is a very large increase in the refractive indices observed. Heating to 200° C. followed by cooling to room temperature results in an extra increase of the refractive index. Two different methods to determine the order parameter were used. The first method uses the refractive indices as described previously. In order to estimate the contribution of the network to the measured refractive indices of the composite an isotropic contribution from CdS is assumed (0.05 before heating and 0.064 after heating). These values were subtracted to obtain the contribution to the refractive index from the network. In the second method a 2 wt. % of reactive dye (for instance the dye of FIG. 1 which can be prepared according to *Mol. Cryst. Liq.* 81(78), 271–277(1981) and can be obtained from BASF) were used in the composites and the order parameter of the dye was determined using the equation below.

$$S = \frac{\varepsilon_{//} - \varepsilon_{\perp}}{\varepsilon_{//} + 2\varepsilon_{\perp}} \quad (2)$$

wherein $\varepsilon_{//}$ and $\varepsilon_{\perp}$ are the absorbance in the direction parallel and perpendicular to the director, respectively. It was found that in all cases the order parameter estimated for the dye is almost the same as the order parameter estimated using the refractive index values. It was found that the order parameter of the network decreased drastically upon building cadmium. Upon production of CdS the order parameter, increased slightly. When the composite material was heated, the mobility increased and the molecules reorganized to assume the orientation with a higher order parameter, which was also present before building cadmium into the system. At higher temperatures, the order parameter decreased again due to the break up of the hydrogen bonds. Upon cooling, the order parameter reached a value at room temperature, which was higher than that obtained before heating. However, this value remained lower than that obtained for the anisotropic network. This means that the presence of CdS crystals distorts the order within the system and the high order parameter is not recovered.

The anisotropic composite of the invention preferably has the nematic, smectic, discotic, or chiral nematic oriented structure.

The substantially water-insoluble inorganic salt, free metal particles, or mixtures thereof are preferably selected from salts or metal particles of Fe, Cr, Co, Ni, Cu, V, Mn, Pd, Ag, Au, Mo, W, Re, Pt, Rh, Pb, Be, Mg, Ca, Sr, Ba, Ra, Zn, Cd, and Hg. The term "substantially water-insoluble" means that less than 0.01 g of the salt dissolves in 100 ml of water at room temperature. Suitable salts are sulfides, which mostly are substantially insoluble in water.

The invention is further illustrated with the following examples.

EXAMPLES

The acrylates such as C5A and C6M were synthesized according to the method of U.S. Pat. No. 5,188,760. The photoinitiator was commercially available Irgacure 651 (ex Ciba Geigy). The uniaxial orientation of the molecules was induced in cells provided with uniaxially rubbed polyimide layers. The cell gap was chosen to be between 1–7 $\mu$m. The refractive index measurements were carried out using an Abbe refractometer which could be thermostated up to 140° C. Birefringence of the samples was measured using a polarizing microscope with a tilting compensator. Refractive indices above 140° C. were extrapolated using the birefringence and the mean refractive index. Samples were heated using a Mettler hot stage. A Perkin Elmer UV-Vis spectrometer provided with circular polarizers was used for measuring the optical properties of the materials. Emission spectra of the samples were measured using a Perkin Elmer luminescence spectrometer LS50B. For infrared measurements Nicolet FTIR equipment was used. Dynamic mechanical thermo analysis (DMTA) was performed using a Polymer Laboratories DMTA equipment.

The structure of the acrylates are shown in FIG. 1. Various mixtures of the samples were placed in the cells and after inducing long range orientation, the polymerization was initiated using UV radiation from a 10W fluorescent lamp (Philips PL10). The polymerized films were neutralized in a solution containing 3 wt. % of cadmium acetate dihydrate, 40 wt. % of ethanol, 7 wt. % of demineralized water, 50 wt. % of dichloromethane. The samples were immersed in the solution for half a day and rinsed in a mixture containing 42 wt. % of ethanol, 8 wt. % of demineralized water, 50 wt. % of dichloromethane to wash away ions, which were not bound to the network. Subsequently, the samples were dried at room temperature and the remnant of the solvent was removed by heating to 150° C. In order to produce CdS quantum dots, cadmium neutralized networks were placed in a tube with dry $H_2S$ for 4 h at atmospheric pressure and room temperature.

The liquid crystalline materials of the invention show a strong photoluminescence with a large Stokes shift and high efficiency. For that reason these materials are very suitable for use in optical devices such as LCD's, emissive displays and optical components such as polarizers and wave plates.

What is claimed is:

1. An anisotropic composite comprising a mixture of an anisotropic oriented polymeric network and an inorganic material, wherein the network comprises one or more binding moieties obtainable from a liquid crystalline monomer or a liquid crystalline mixture of monomers, at least one of the monomers comprising a polymerizable group selected from the group consisting of acrylate, epoxy, oxetane, vinyl ether, and thiolene, wherein the inorganic material is a substantially water-insoluble metal salt, a free metal particle, or a mixture thereof, and wherein the network has an order parameter S greater than 0.01, and wherein the inorganic material is incorporated into the network by chemical reaction.

2. The anisotropic composite of claim 1 wherein the order parameter S is greater than 0.1.

3. The anisotropic composite of claim 1 wherein one or more binding moieties comprises a COOH, pyridine, or polyether moiety.

4. The anisotropic composite of claim 1 wherein the inorganic material is a conductor or a semi-conductor.

5. The anisotropic composite of claim 1 having a nematic, smectic discotic or chiral nematic structure.

6. A method for manufacturing the anisotropic composite of claim 1 wherein the metal salt of the intermediate anisotropic oriented network product of claim 6 is converted to a substantially water-insoluble metal salt, a free metal particle, or a mixture thereof.

7. An optical device comprising the anisotropic composite of claim 1.

8. A method for manufacturing an intermediate anisotropic oriented network product having one or more binding moieties, comprising polymerizing a liquid crystalline monomer or a liquid crystalline mixture of monomers, at least one of the monomers comprising a polymerizable group selected from the group consisting of acrylate, epoxy, oxetane, vinyl ether, and thiolene, incorporating a metal salt into the network by chemical reaction to obtain the intermediate anisotropic oriented network product comprising the metal salt.

9. The method of claim 8 wherein the solubility of the metal salt is greater than 0.02 g per 100 ml of water at room temperature.

10. A method for manufacturing an intermediate anisotropic oriented network product having one or more binding moieties, comprising polymerizing a liquid crystalline monomer or a liquid crystalline mixture of monomers, at least one of the monomers comprising a polymerizable group selected from the group consisting of acrylate, epoxy, oxetane, vinyl ether, and thiolene, in the absence of a metal salt, followed by mixing with a metal salt and incorporating the metal salt into the network by chemical reaction, to obtain the intermediate anisotropic oriented network product comprising the metal salt.

11. The method of claim 10 wherein the solubility of the metal salt is greater than 0.02 g per 100 ml of water at room temperature.

12. A method for manufacturing the anisotropic composite of claim 1 wherein the metal salt of the intermediate anisotropic oriented network product obtained by the method of claim 10 is converted to a substantially water-insoluble metal salt, a free metal particle, or a mixture thereof.

* * * * *